United States Patent Office 3,168,303
Patented Feb. 2, 1965

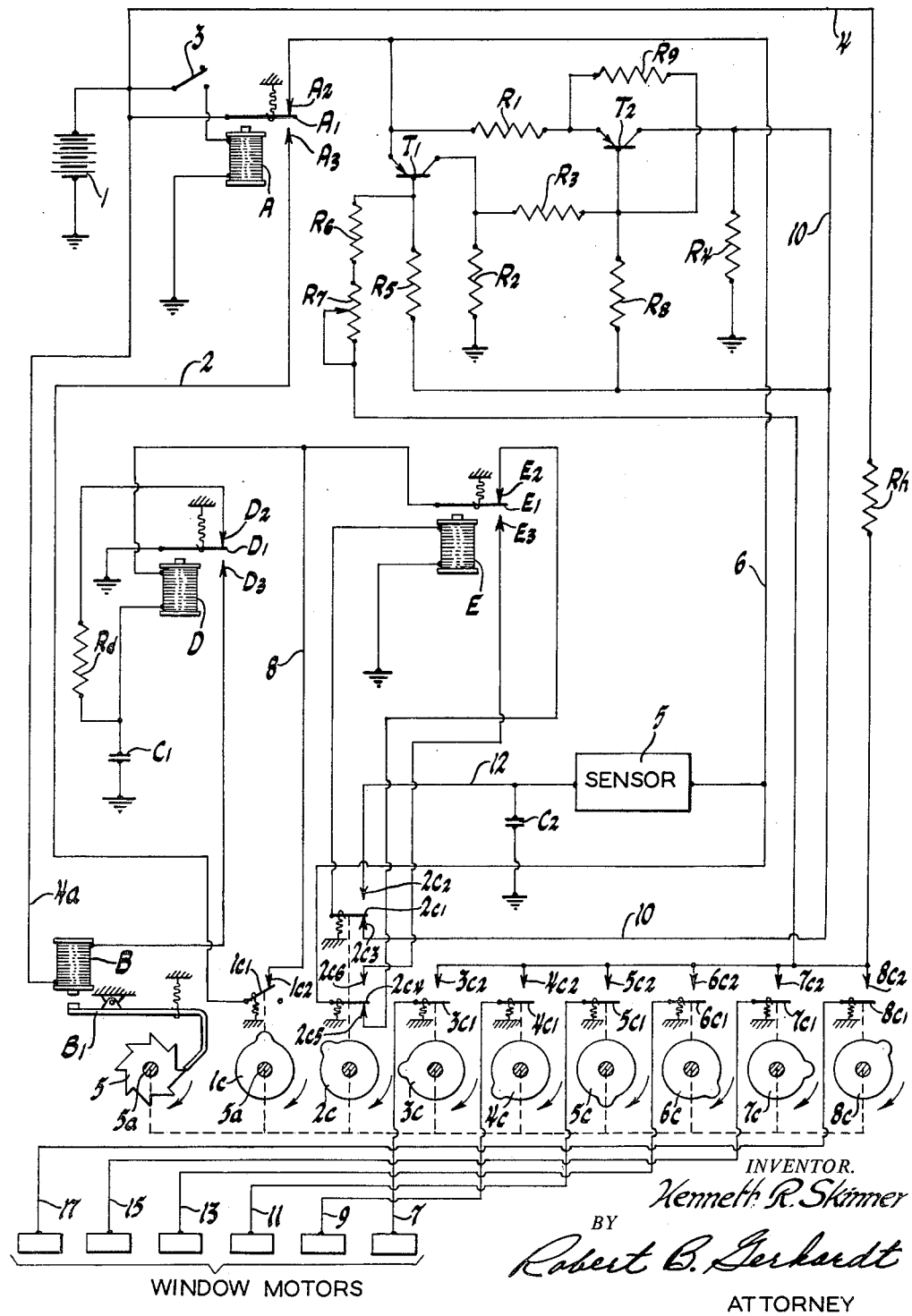
WINDOW MOTORS

3,168,303
MOISTURE RESPONSIVE WINDOW
CONTROL SYSTEM
Kenneth R. Skinner, Anderson, Ind., assignor to General
Motors Corporation, Detroit, Mich., a corporation of
Delaware
Continuation of application Ser. No. 834,490, Aug. 18,
1959. This application Nov. 8, 1962, Ser. No. 237,433
10 Claims. (Cl. 268—19)

The present application is a continuation of my application Serial No. 834,490, now abandoned, filed August 18, 1959.

This invention relates to a moisture controlled automatic window closing system and more particularly to such a system especially applicable to motor vehicles having power operated windows.

Many motor vehicles are presently equipped with power operated windows. There have been proposals whereby such windows are automatically closed in the event of rain allowing the driver to leave the windows open while away from the vehicle. Since electric motors of the type used to operate vehicle windows draw substantial current, it is necessary to limit any automatic window closing to successive operation wherein; first one window is closed and then a second window, etc., so that only one window motor operates at a time and hence the vehicle battery is not overloaded. To provide this sequential operation it has been proposed to utilize limit switches, photoelectric cells, etc., to turn off one window motor and turn on the next motor. Other proposals have provided special current sensitive relays in each motor circuit to sense when the motor has stalled due to its associated window reaching a closed position. All of the above proposals require special and elaborate installations.

The present invention provides a single package unit that can be mounted remotely from the windows and also easily be adapted to existing power window installations. Each window motor is successively operated and then completely turned off automatically. The invention also provides a safety stoppage of the raising of any window in the event that an obstacle such as a person's arm is in the path of the window. The invention also provides for the automatic by-passing of any window that is already closed when rain or other moisture starts the system in operation.

It is therefore an object of the invention to provide an automatic window closing system for closing windows in the event of rain.

It is a further object of the invention to provide such an automatic system wherein the windows are sequentially closed and where the final closing of one window initiates the closing of the next window.

Still a further object is to provide a relatively simple, compact, and low power consuming automatic window closing system.

These and other objects and advantages will be readily apparent to those skilled in the art from the following disclosure and accompanying figure.

Briefly, the invention as set forth in the representative embodiment shown schematically in the figure, and especially suitable for use in a motor vehicle, utilizes a stepping relay to successively and sequentially actuate individual window motor switches. A moisture sensitive device is conditioned for operation by opening the conventional ignition switch. As each motor raises its associated window to a closed position the current drawn by that motor increases as the motor stalls. A conventional wiring harness connecting the motors with the vehicle battery has a small but measurable resistance therein. The invention utilizes the change in voltage across this internal wiring resistance due to the increased current drawn by the window motor, to control a transistor amplifier and electronic switch connected to control the motor switch stepping relay to sequentially change the battery voltage from one window motor to another.

Referring to the figure which schematically illustrates one form of the invention, 1 represents a battery or other voltage source. The voltage in the illustration would be approximately 12 volts although obviously other higher or lower voltages can be used if the components of the system are properly chosen. A manual switch 3, such as the ignition switch in a motor vehicle, connects the battery to the coil of a relay A having a movable contact $A_1$ in normal engagement with contact $A_2$ and $A_3$. With the switch 3 open, a spring holds contact $A_1$ in normal engagement with contact $A_2$ whereby lead 6 is connected to the battery. When the ignition switch 3 is closed the contacts $A_1$–$A_3$ connect lead 2 to the battery and lead 6 is disconnected therefrom. Leads 4 and 4a are always connected to the battery.

A stepping ratchet relay B has a pivoted armature $B_1$ that acts to rotate a toothed wheel 5 a fixed amount each time the relay B is energized to move the armature. The wheel 5 in turn carries a shaft 5a having secured thereon eight switch operating cams 1C to 8C inclusive. Cams 3C to 8C control normally open contacts $3C_1$–$3C_2$ to $8C_1$–$8C_2$ respectively, that are sequentially closed to connect battery lead 4 to leads 7, 9, 11, 13, 15 and 17 which supply electric current to the individual window motors. The motors are located in any suitable position to raise and lower the windows to be controlled such as the front, rear, and vent windows in a motor vehicle.

Cam 1C controls normally open contacts $1C_1$–$1C_2$ to connect lead 2 with a lead 8 connected to the coil of a relay D having a movable contact $D_1$ connected to the electrical ground and normally engaging a contact $D_2$ to discharge a capacitor $C_1$ through a resistor $Rd$. When the relay D is energized, the movable contact $D_1$ breaks away from contact $D_2$ and engages contact $D_3$ to furnish a ground for the stepping relay coil B.

A sensitive relay E has a movable contact $E_1$ connected to the lead 8 and normally engaging a contact $E_2$ to connect the lead 8 and hence the coil of relay D with lead 6 through normally closed contacts $2C_4$–$2C_5$ controlled by cam 2C. When relay E is energized as described below, contact $E_1$ breaks from contact $E_2$ and engages contact $E_3$ to connect lead 8 and hence the coil of relay D to contact $2C_6$. Cam 2C can move the movable contact $2C_4$ to connect lead 6 with contact $2C_6$ and connected contact $E_3$ of relay E.

Cam 2C also simultaneously controls a movable contact $2C_1$ which normally engages a contact $2C_3$ to connect the coil of relay E to a control lead 10. Cam 2C can move the contact $2C_1$ away from contact $2C_3$ to engage contact $2C_2$ and connect the coil of relay E to lead 12 extending from one side of a moisture sensor 5. The other side of the sensor 5 is connected to lead 6 normally connected to the battery 1 through normally closed contacts $A_1$ and $A_2$ of relay A. The sensor 5 which may be of a suitable form, is of the type that has a relatively high resistance when dry and a relatively low resistance when wet. Sensor 5 is located in any suitable exposed place such as the hood or fender of the motor vehicle and acts to provide low resistance electrical connection between leads 12 and 6 when wet.

Lead 10 is connected to the output of an amplifier and switching unit including a pair of transistors $T_1$ and $T_2$. The transistors $T_1$ and $T_2$ may be of any suitable type such as PNP type 2N270. The emitter of $T_1$ is connected to the battery 1 through normally closed contacts $A_1$ and $A_2$ of relay A and the emitter of $T_2$ is connected through a low value stabilizing resistor $R_1$ which may be about 33 ohms. The collector of $T_1$ is connected to ground through a load resistor $R_2$ (1500 ohm) and to the base of $T_2$ through a coupling resistor $R_3$ (10K ohm). The collector of $T_2$ is connected to ground through a load resistor $R_4$ (15K ohm) and directly to lead 10, through which it is connected through normally closed contacts $2C_1$ and $2C_3$ to the coil of relay E to energize the same whenever current is supplied from $T_2$. The control base of $T_1$ is biased through resistor $R_5$ (1500 ohm) and connected through a fixed resistor $R_6$ (3900 ohm) and a variable resistor $R_7$ (1000 ohm) to the motor side of wiring harness 4 connecting the battery 1 with the window motor switches controlled by cams 3C to 8C.

The lead 4 is of appreciable length and has a small but measurable internal resistance represented in the figure by $R_H$. In a sypical vehicle installation, $R_H$ might have a value such that the change in current drawn by a single window motor, when stalling, will cause a 0.3 volt change in voltage drop across the length of lead 4. By adjusting $R_7$ for each installation, the transistor $T_1$ is conditioned to be turned off whenever the current through lead 4 is less than a predetermined value as when any motor is running free or with the motors all turned off. With $T_1$ cut off, current flow through $T_1$'s collector resistor $R_2$ will be small and the voltage on the base of $T_2$ will be low enough so that $T_2$ will conduct allowing a fairly high current to flow from $T_2$'s collector to lead 10.

When a running motor stalls due to its window hitting the top, the current drawn by the motor increases, and the increased voltage drop in wiring 4 results in a less positive voltage present at the base of $T_1$. $T_1$ then will conduct and the resulting increased current flow through $R_2$ will make the voltage on the base of $T_2$ more positive, resulting in $T_2$ being turned off. This stops the flow of current to lead 10. $R_8$ provides a fixed bias for the base of $T_2$ while $R_9$ is a stabilizing self bias resistor in $T_2$ when $T_1$ is non-conducting.

*Operation*

The system as shown in the figure is in a position as if the windows have been fully raised and the system has stopped in a position to prevent further operation. When the ignition switch 3 is closed, solenoid A is energized closing the contacts $A_1$ and $A_3$. Battery voltage is then applied to the coil of relay D through contacts $1C_1$–$1C_2$ controlled by cam 1C. $C_1$ has previously been drained of any charge to ground through $Rd$ and contacts $D_1$–$D_2$. Therefore at this time, the junction of $C_1$ and the coil of relay D is essentially at ground voltage. When relay A is then energized, relay D will also be energized to close contacts $D_1$–$D_3$. This acts to provide a ground for the coil of relay B and cause the same to move armature $B_1$ to rotate wheel 5 one step. Cam 1C will then no longer hold contacts $1C_1$ and $1C_2$ closed and the voltage to relay D will be broken which in turn causes the connection between ground and the coil of B to be broken. The armature spring for relay B will return the armature $B_1$ into position to be able to again rotate wheel 5.

With the initial rotation of wheel 5, all the cams 1C to 8C will have moved one step. Cam 2C will close contacts $2C_1$ and $2C_2$ to place the sensor 5 in series with the sensitive relay coil E. Simultaneously contact $E_3$ of relay E is connected to lead 6 through contacts $2C_4$ and $2C_6$. The system is now reset.

If the ignition switch 3 is now opened, as where the driver leaves the car, relay A will be de-energized and batter voltage applied through contacts $A_1$ and $A_2$ to lead 6. The system is now conditioned for automatic operation. If the windows have previously been opened and it begins to rain, the sensor 5 will allow enough current to flow through the coil of relay E to energize the same to close contacts $E_1$–$E_3$. This applies battery voltage to the coil of relay D. As before, capacitor $C_1$ has been discharged to ground through $Rd$, and the coil of relay D will be energized to close contacts $D_1$–$D_3$ providing a ground for the coil of relay B. This causes relay B to ratchet one more step. Cam 3C will be moved to close contacts $3C_1$–$3C_2$ applying battery voltage from wiring harness 4 to lead 7 which is connected to one of the window motors (e.g. left front window). Cam 2C has meanwhile advanced so that $2C_4$–$2C_5$ and $2C_1$–$2C_3$ have closed.

During the time that all the window motors were off and during the time that the window motor controlled by cam 3C is freely raising its window, the first transistor $T_1$ will be turned off since the voltage drop across the wiring harness 4 will be low. With $T_1$ turned off $T_2$ will be biased on and relay E will be energized. As soon as the first window reaches the top, the current drawn by the motor will increase, causing an increase in the voltage drop across the internal resistance $R_4$ of the wiring harness. A less positive voltage will then be applied to the base of $T_1$ causing $T_1$ to conduct and raise the voltage at the base of $T_2$ causing $T_2$ to cut off. With $T_2$ no longer conducting, the coil of relay E will be de-energized, allowing contacts $E_1$–$E_2$ to close to apply battery voltage from lead 6 to the coil of relay D through contacts $2C_4$–$2C_5$. Relay D is then energized to close contacts $D_1$–$D_3$ again providing a ground for relay B. Relay B then again ratchets to move the cams into their next position. This step causes cam 3C to allow contacts $3C_1$–$3C_2$ to open cutting off the window motor (left front window). Simultaneously cam 4C closes its contacts $4C_1$–$4C_2$ to connect the wiring harness 4 with the lead 9 to energize another window motor (e.g. right front window).

With the stalled left front window turned off, the voltage drop across $R_H$ of lead 4 is reduced allowing transistor $T_1$ to cause $T_2$ to again conduct. Relay E is then again energized cutting off the battery voltage to the coil of relay D. When the second window (right front) has reached the top, the same action takes place that took place when the first window reached the top. This causes relay B to again ratchet and the series of actions continues until all the windows are raised.

In the event that one of the windows is already raised, the system will respond as follows. Assume that the right front window (controlled by cam 4C) is up when it begins to rain and the system starts into operation. The left front window will be raised by action cam 3C as before. When it reaches the top and the motor stalls, the current through $R_H$ increases to turn $T_1$ on and turn $T_2$ off causing relay E to de-energize. This applies battery voltage to the coil of relay D providing a ground for relay B causing it to step. Cam 4C is now in a position to close contacts $4C_1$–$4C_2$ to apply battery voltage to lead 9 (right front window). Since this window is already up and the motor cannot operate freely, the current through $R_H$ remains high and $T_1$ continues to conduct and $T_2$ remains non-conducting. Relay E is therefore still de-energized. Meanwhile the coil of relay D is still energized through contacts $E_1$–$E_2$. As soon as $C_1$ becomes charged, the current flow through the coil of relay D will decrease and relay D will release allowing contacts $D_1$–$D_2$ to close. With contacts $D_1$–$D_2$ closed, a discharge path for $C_1$ is provided through $Rd$ for $C_1$. As soon as $C_1$ has lost enough charge, relay D will pull back on, since the battery voltage is still being applied via $E_1$–$E_2$ of relay E. With relay D turned on, the relay B will be energized, causing a further ratchet of the cams to turn the next window motor on.

After the last window is raised the relay B and cam 1C to 8C will be as shown in the print. The system will then be inoperative until relay A is again energized by turning the ignition key 3 on to reset the system. Capacitor $C_2$ is provided to ensure that once the sensor 5 has become wet, relay E will close long enough to cause the relay B to make one complete step.

The invention may be utilized in applications other than window controls. For example, the rain sensor and control could be used with an automatic convertible top whereby the top is raised when it begins to rain. When the top reaches its closed position the automatic cut off will act to cut off the system.

Changes in the invention and other applications of the same will be apparent to those skilled in the art and such changes and applications are within the scope of the invention which is to be limited only by the following claims.

I claim:

1. A rain responsive automatic window closing system including a voltage source, a window operating motor connected to close a window, wiring connecting said voltage source with said motor, a switch connected between said source and said motor, switch operating means, moisture responsive means connected between said switch operating means and said voltage source and operative when wet to energize said switch operating means to cause said switch operating means to close said switch and connect said motor with said voltage source, said wiring having a predetermined resistance providing less than a predetermined voltage drop between said voltage source and said motor when said motor is operating freely and providing said predetermined voltage drop when said motor is stalled due to its window encountering a resistance, and additional means connected between said switch operating means and said voltage source and responsive to said predetermined voltage drop for causing said switch operating means to open said switch upon the occurrence of said predetermined voltage drop.

2. A rain responsive automatic window closing system including a voltage source, a plurality of window operating motors each connected to close a window, a plurality of motor switches, wiring connecting said voltage source with said switches, switch actuating means for sequentially controlling said switches, moisture responsive means connected between said switch actuating means and said voltage source and operative when wet to energize said actuating means to close one of said switches to connect one of said motors with said voltage source, said wiring having a predetermined resistance providing less than a predetermined voltage drop between said voltage source and said motor when said motor is operating freely and providing said predetermined voltage drop when said one motor is stalled due to its window encountering a resistance, and additional means connected between said switch actuating means and said voltage source and responsive to said predetermined voltage drop to cause said switch actuating means to open said one of said switches to disconnect said one of said motors from said voltage source and to close a second of said switches to connect a second of said motors to said voltage source upon the occurrence of said predetermined voltage drop.

3. An automatic window closing system comprising a voltage source, a window operating motor, wiring connecting said voltage source with said motor, said wiring having a predetermined resistance providing a first level of voltage drop between said voltage source and said motor when said motor is operating freely and providing a second higher level of voltage drop when said motor is stalled due to its window encountering an obstruction, switching means connected between said source and said motor, switch actuating means connected across said source, and additional means connected between said source and said switch actuating means and responsive to the voltage drop across said wiring whereby said motor is disconnected from said source upon the occurrence of said second level of voltage drop.

4. A rain responsive automatic window closing system including a voltage source, a plurality of window operating motors each connected to close a window, a plurality of motor switches, wiring connecting said voltage source with said switches, actuating means for sequentially controlling said switches, moisture responsive means operatively connected to said actuating means to cause the same to close one of said switches to connect one of said motors with said voltage source when said moisture responsive means is wet, said wiring having a predetermined resistance providing less than a predetermined voltage drop between said voltage source and said motor when said motor is operating freely and providing more than said predetermined voltage drop when said one motor is stalled due to its window reaching a closed position, and additional means operatively connected to said actuating means and said wiring and responsive to more than said predetermined voltage drop to cause said actuating means to open said switch to disconnect said one motor from said voltage source and to close a second of said switches to connect a second of said motors to said voltage source, and time delay means operatively associated with said actuating means for causing the same to open said second of said switches after a predetermined interval of time if the window associated with the second of said motors is closed.

5. In a rain responsive automatic window lift system for a multi window vehicle, the combination including a plurality of normally open switches connected to control individual window operating motors, switch operating means to successively and progressively close said switches, control means for said switch operating means, a direct current voltage source, moisture responsive means connected to said voltage source, an additional switch arranged to be operated by said switch operating means and having a first position connecting said moisture responsive means with said control means and operable to cause said control means to energize said switch operating means when said additional switch is in its first position and said moisture responsive means is wet, amplifier means having a control element and having a controllable current output connected through said additional switch in a second position thereof to said control means, wiring connecting said voltage source with each of the window motor switches, said wiring having a predetermined internal resistance providing a first level of voltage drop through its length when one of the window motors is freely raising its associated window and providing a higher second level of voltage drop when a window motor has stalled due to its associated window hitting a resistance, and biasing means for said amplifier control element connected to the motor end of said wiring and adjusted to cause said amplifier to change its current output to said control means when said voltage drop is at said higher level.

6. In a rain responsive automatic window lift system for a multi window vehicle, the combination including a plurality of normally open switches connected to control individual window operating motors, switch operating means to successively and progressively close said switches, control means for said switch operating means, a direct current voltage source, moisture responsive means connected to said voltage source, an additional switch arranged to be operated by said switch operating means and having a first position connecting said moisture responsive means with said control means and operable to cause said control means to energize said switch operating means when said additional switch is in its first position and said moisture responsive means is wet, amplifier means having a control element and having an output connected through said additional switch in a second position thereof to said control means, wiring connecting said voltage source with each of the window motor switches, said wiring having a predetermined internal resistance providing a first level of voltage drop through its lengths when one of the window motors is freely raising its associated window and providing a higher second level of voltage drop when a window motor has stalled due to its associated window hitting a resistance, and biasing means for said amplifier control element connected to the motor end of said wiring and adjusted to cause said amplifier to conduct current from said voltage source to said control means only when said voltage drop is at said lower level.

7. A rain responsive aumomatic window system for a multi window vehicle, the combination including switching means for controlling individual window operating motors, operating means to actuate said switching means to successively and progressively energize said motors, a direct current voltage source, relay means for connecting said operating means across said source, moisture responsive means connected to said voltage source, an additional switch controlled by said operating means and having a first position operatively connecting said moisture responsive means to said relay means whereby said operating means is energized when said additional switch is in its first position and said moisture responsive means is wet, electronic amplifier and switching means having a control element and an output connected to said relay means through said additional switch in a second position thereof, wiring connecting said voltage source with each of the window motor switches, said wiring having a predetermined internal resistance providing less than a predetermined voltage drop through its length when passing current to a window motor that is freely raising its associated window and providing said predetermined voltage drop when passing current to a window motor that has stalled due to its associated window hitting a resistance, and biasing means for said amplifier control element connected to the motor end of said wiring whereby said relay means is de-energized and connects said operating means across said source upon the occurrence of said predetermined voltage drop.

8. A rain responsive automatic window lift system for a multi window vehicle including a plurality of window motor actuating switches arranged to control individual window operating motors, a cam shaft, a plurality of cams on said shaft arranged to successively actuate said motor actuating switches as said shaft is rotated, first relay means for rotating said shaft in stepped movements, a voltage source, second relay means, an additional switch having a first and second position and controlled by one of said cams, moisture responsive means having a relatively high resistance when dry and a relatively low resistance when wet connected between said voltage source and said second relay means when said additional switch is in said first position, third relay means controlled by said second relay means and connected to control said first relay means, wiring connecting said voltage source with said motors upon the closing of the associated motor actuating switch, said first relay means being energized to actuate said additional switch to said second position and to close one of said associated motor actuating switches when said moisture responsive means is wet, amplifier means connected between said voltage source and said second relay means when said additional switch is in said second position, said wiring having a predetermined internal resistance providing a first level of voltage drop when supplying current to a window motor freely raising its associated window and providing a second higher level of voltage drop when a window motor has stalled due to its associated window reaching its closed position or hitting an object, and biasing means for said amplifier connected to the motor end of said wiring harness and adjusted to cause said amplifier to conduct current from said voltage source to said second relay only when said voltage source is at said first level, whereby said third relay will be energized to cause said first relay to advance said shaft and cams when said voltage drop changes from said first level to said second level.

9. The system of claim 8 in which time delay means are provided for said third relay means to cause the same to be de-energized after a predetermined period of time irrespective of the control by said second relay means.

10. A rain responsive automatic window lift system for a multi window vehicle including a plurality of window motor actuating switches arranged to control individual window operating motors, a cam shaft, a plurality of cams on said shaft arranged to successively actuate said switches as said shaft is rotated, first relay means for rotating said shaft in stepped movements, a voltage source, moisture responsive means having a relatively high resistance when dry and a relatively low resistance when wet and connected to said voltage means, second relay means, a pair of additional switches successively actuated by a pair of said cams, third relay means controlled by said second relay means and connected to control said first relay means, one of said additional switches in one position thereof connecting said moisture responsive means with said second relay means to cause said second relay means to energize said first relay means when said moisture responsive means is wet, amplifier means connected through said one additional switches in another position thereof to said second relay means, wiring connecting said voltage source with said window switches, said wiring having a predetermined internal resistance providing a first level of voltage drop when supplying current to a window motor freely raising its associated window and providing a second level of voltage drop when a window motor has stalled due to its associated window reaching its closed position or hitting an object, biasing means for said amplifier connected to the motor end of said wiring harness and adjusted to cause said amplifier to conduct current from said voltage source to said second relay only when said voltage drop is at said first level whereby said second relay will be energized to cause said first relay to advance said shaft and cams when said voltage drop changes from said first level to said second level, and a manual switch for operatively connecting said voltage source to said third relay means to cause the same to actuate said first relay and advance said cam shaft, said last mentioned connection being through the other of said additional switches.

References Cited in the file of this patent
UNITED STATES PATENTS

| | | |
|---|---|---|
| 2,754,460 | Goldman | July 10, 1956 |
| 2,846,633 | Gengrich | Aug. 5, 1958 |